April 25, 1933.  F. W. MARTIN  1,905,647
FLEXIBLE PIPE COUPLING FOR RAILWAY VEHICLES
Filed Jan. 9, 1930  3 Sheets-Sheet 1
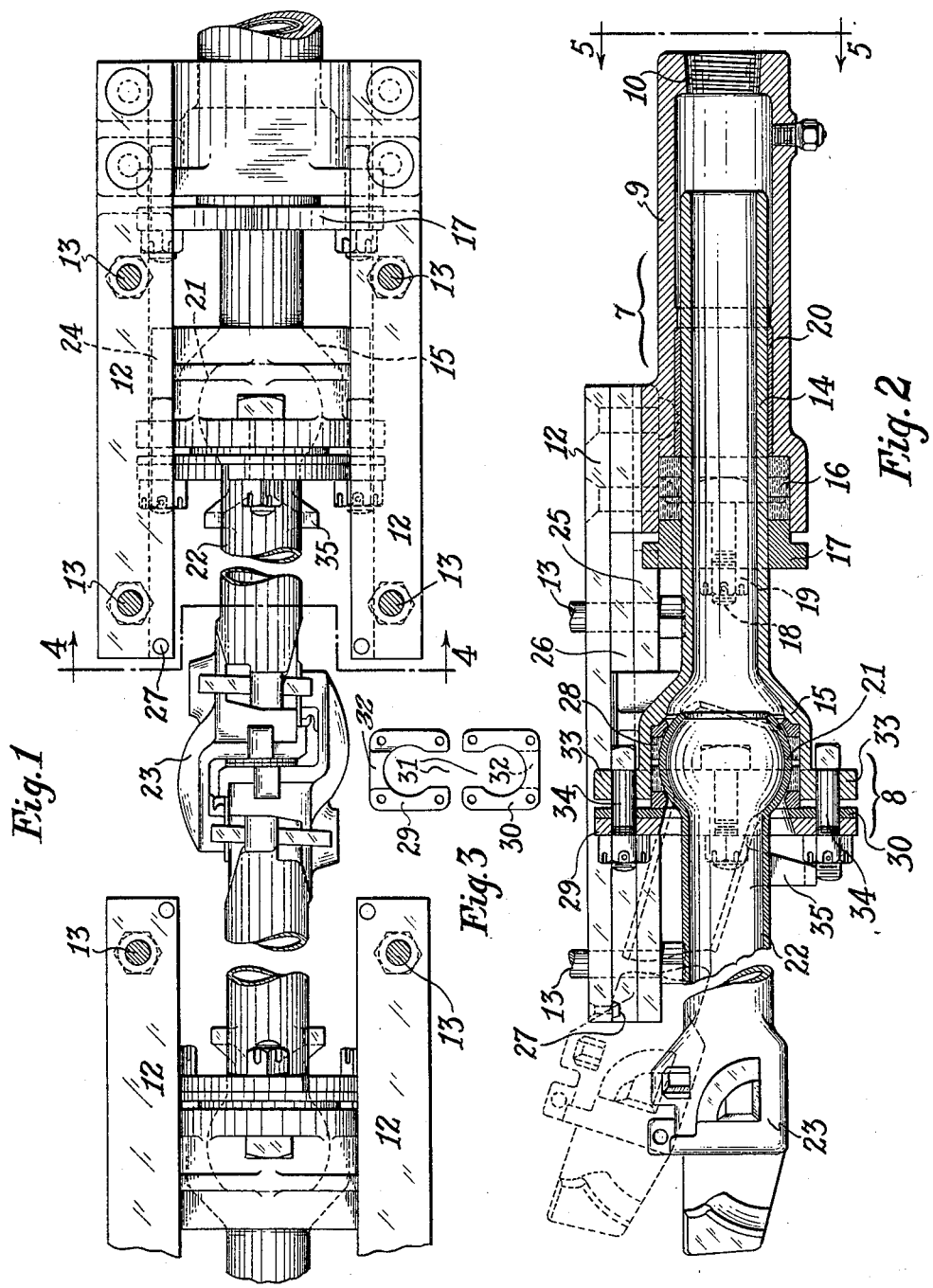
INVENTOR
Frederick W. Martin
BY
Synnestvedt & Lechner
ATTORNEYS April 25, 1933. F. W. MARTIN 1,905,647
FLEXIBLE PIPE COUPLING FOR RAILWAY VEHICLES
Filed Jan. 9, 1930 3 Sheets-Sheet 2

INVENTOR
Frederick W. Martin
BY
Synnestvedt & Lechner
ATTORNEYS

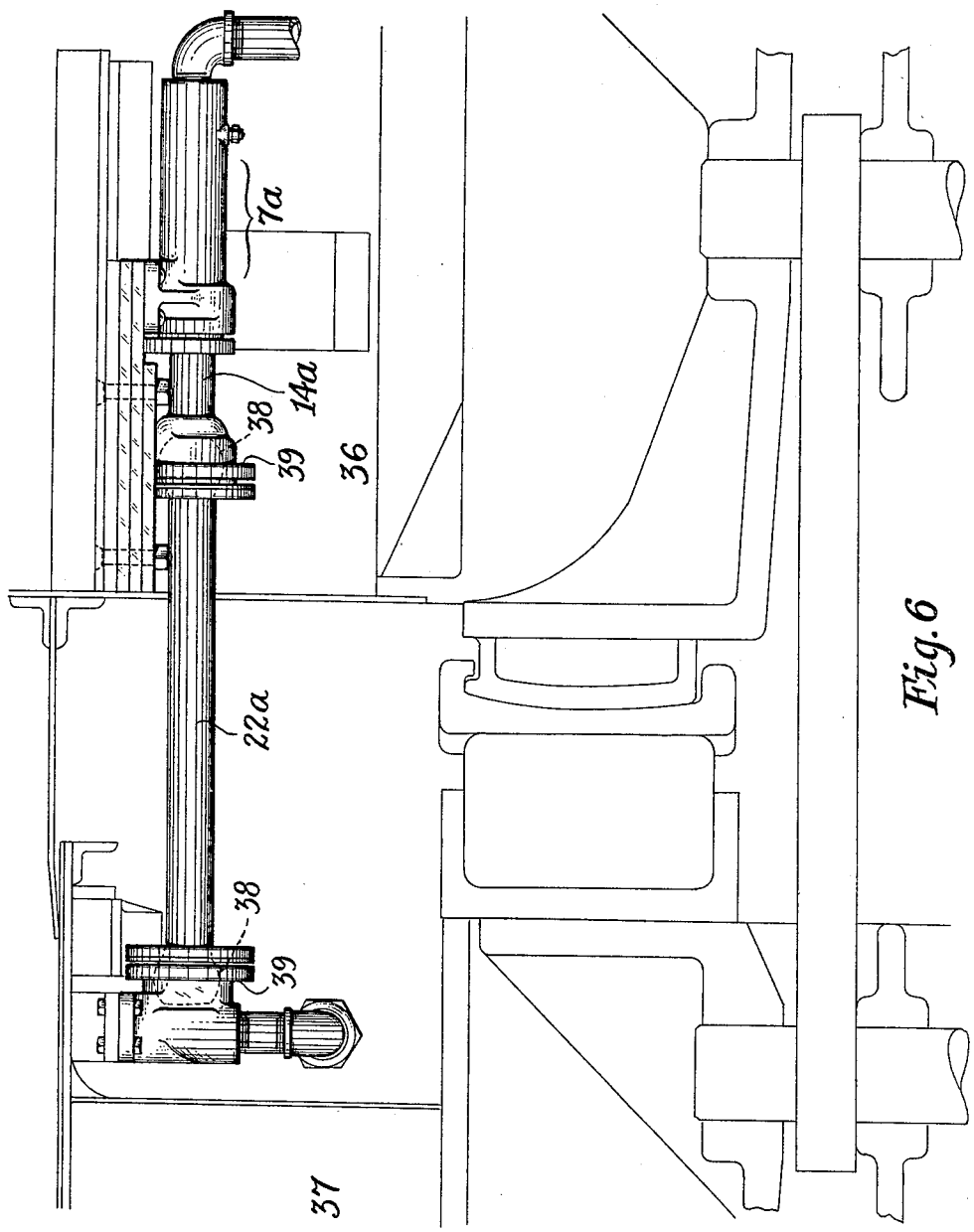

Patented Apr. 25, 1933

1,905,647

UNITED STATES PATENT OFFICE

FREDERICK W. MARTIN, OF BRONXVILLE, NEW YORK, ASSIGNOR TO FRANKLIN RAILWAY SUPPLY COMPANY, OF NEW YORK, N. Y., A CORPORATION OF DELAWARE

FLEXIBLE PIPE COUPLING FOR RAILWAY VEHICLES

Application filed January 9, 1930. Serial No. 419,480.

This invention relates to pipe couplings between railway vehicles and particularly to the all-metal type of connection.

Among the objects of the invention are the provision of a coupling in which all threaded connections are eliminated except at the point where the pipe under the car joins the coupling structure. In this way I overcome much of the trouble due to short life and leakage heretofore encountered in couplings of this character.

Another object of the invention is the provision of a construction with which the customary hose coupling can be used.

A still further object of the invention resides in the provision of an all metal coupling in which adjacent connecting units are cast integral with the uniting conduit.

Still other objects of the invention involve the provision of a coupling of the character described which is of simpler yet sturdier construction, which is more easily and cheaply manufactured, and with which can be employed some form of a well known standard type of hose coupling, the coupling as a whole permitting substantially the usual movements of the parts in effecting a connection between vehicles.

How the foregoing, together with such other objects as may appear hereinafter, or are incident to my invention, are obtained, is illustrated in a preferred form in the accompanying drawings, wherein—

Fig. 1 is a plan view of my improved coupling as embodied in a construction for use between railroad cars.

Fig. 2 is a vertical longitudinal section of the coupling structure at the end of a car.

Fig. 3 is a detail plan view of a pair of cooperating plates which are used in assembling certain of the parts of my improved coupling.

Fig. 6 is a side elevation of a modified form of my improved coupling which is especially suitable for use between an engine and its tender, the figure indicating the adjacent parts of the engine and tender structure.

Figure 4:
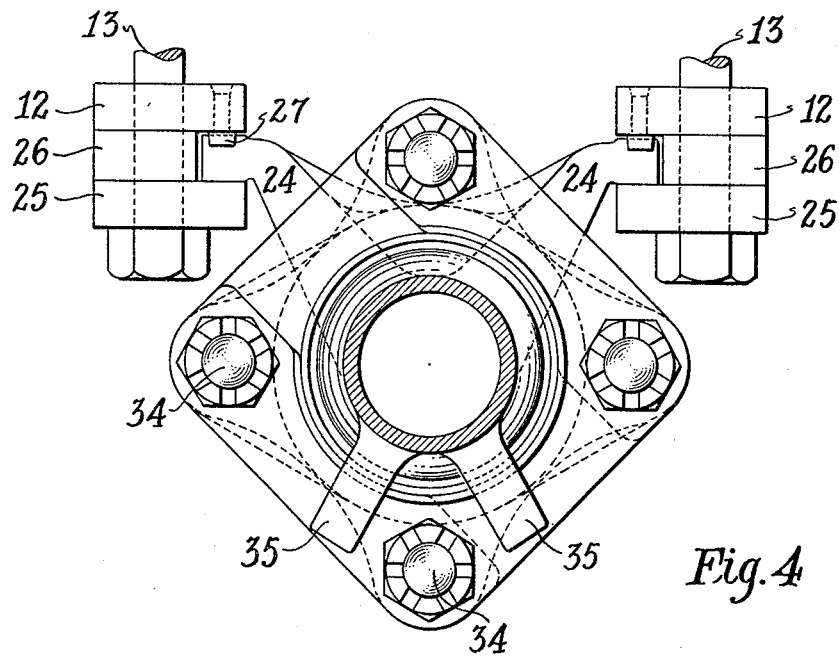
Fig. 4 is a section on the line 4—4 of Fig. 1.
Figure 5:
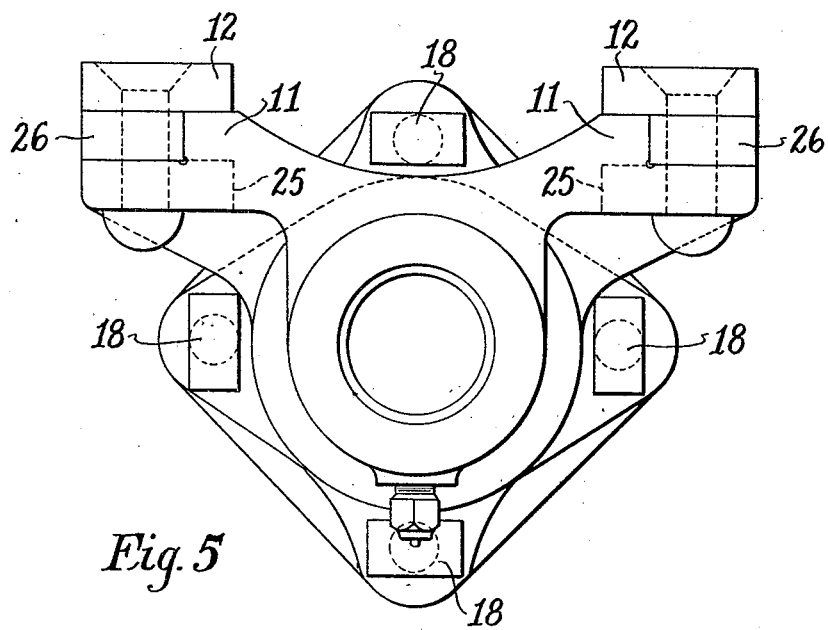
Fig. 5 is an elevation of the right hand end of the structure shown in Fig. 2, taken as indicated by the line 5—5.

Referring to the drawings and particularly to Figs. 1 to 5 inclusive, it will be seen that the coupling structure for each end of a car includes a sliding or telescoping joint 7 and a flexible or ball joint 8. The outer member 9 of the sliding joint is provided with an internal thread 10 to which the train pipe (not shown) is adapted to be connected, and attention is here directed to the fact that this threaded connection is the only such connection which it is necessary to use with my improved coupling.

The member 9 at its outer end (that is, the end away from the center of the car) is provided with a pair of upwardly and outwardly projecting arms or brackets 11 which are riveted or otherwise suitably secured at each side to the supporting bars 12, which latter, in turn, may be fastened to the framework of the car in any desired manner, as by bolts 13.

The inner member 14 of the telescoping joint has formed integrally therewith at its outer end the socket member 15 of the flexible joint 8. Suitable packing 16 is placed between the members 9 and 14 and the packing gland 17 associated therewith is held in place by a series of flat headed bolts 18 with their nuts 19. I prefer to use a bushing 20 between the members 9 and 14, although this is not absolutely essential.

The connecting unit or ball member 21 of the flexible joint 8 is cast integral with the connecting conduit or pipe 22 upon the outer end of which and also cast integral therewith is the connecting unit or hose type coupling member 23, which latter is of well known standard construction.

Projecting upwardly and outwardly from the socket member 15 are the supporting arms or brackets 24 adapted to have a sliding fit between the upper supports or guideways 12 already mentioned and the lower supports or guideways 25. The guideways 12 and 25 are suitably spaced apart by the spacing members 26 which are somewhat narrower than the guides 12 and 25 in order to provide the necessary space for receiving the arms 24. Stops 27 are provided at the ends of the guideways for the purpose of limiting the movement of the sliding member 14.

The ball 21 is surrounded in the usual manner by any suitable type of split packing rings 28 which are held in place by means of the U-shaped plates 29 and 30, which, for purposes of assembly, are arranged to have interlocking sliding engagement with each other by virtue of the slots 31 and the projections 32.

The socket 15 is provided with a plurality of ears 33 through which the flat headed retaining bolts 34 are adapted to pass, the plates 29 and 30 being suitably apertured to receive the bolts 34.

Projecting downwardly and outwardly from the connecting conduit 22 and also cast integral therewith are the stop members 35 which embrace the lower bolt 34 in such a way as to take thereagainst upon excessive rotation of the ball 21. In this way I provide for maintaining the coupling member 23 in its proper position.

A connection between cars equipped with the coupling construction just described is effected by raising the abutting members 22 to the dotted line position shown in Fig. 2 and then placing the coupling units 23 in position against each other in the manner usual with this type of hose connection and then dropping them down to the horizontal position shown in full lines in Fig. 2. It will be seen, therefore, that by means of my improvements I am enabled to utilize the conventional or standard type of hose coupling and to effect a connection between cars by means of substantially the usual movements of the various parts involved.

By casting the connecting units 21 and 23 integral with the uniting conduit 22 and otherwise constructing the coupling as described, I am enabled to eliminate all threaded connections except the one at the inner end of the coupling where it joins the train pipe and which has been referred to by the reference character 10. The structure, as a whole, is extremely sturdy and easily manufactured and its simplicity makes it efficient in operation and easily maintained in service. Other advantages will occur to those skilled in the art.

The coupling shown in Fig. 6 is suitable for use between railway vehicles where it is not necessary to repeatedly couple and uncouple the parts, and I have shown in this figure a more simple and permanent type of construction. The uniting conduit 22a between the engine 36 and the tender 37 has cast integrally therewith at each end a connecting unit or ball member 38, each of which forms a part of a suitable flexible or ball joint 39.

On one of the vehicles in this figure, (in this instance, the locomotive) a sliding or telescoping connection 7a is provided which, in detail, is substantially identical with the sliding connection 7 illustrated in Figs. 1 to 5 inclusive, and which, therefore, is not further illustrated in Fig. 6. The member 14a is the interior or sliding member of this telescoping joint 7a, the sliding motion being taken care of in the manner indicated in the other figures.

I claim:—

1. A flexible connection for use between coupled railway vehicles including a conduit having a flexible joint part associated with an end thereof, a cooperating flexible joint part, and means for securing the joint parts in operative relationship including a pair of U-shaped members adapted to engage the conduit and having cooperating interengageable portions providing against relative rotation of the members about the conduit.

2. A flexible connection for use between coupled railway vehicles including a conduit having a flexible joint part associated with an end thereof, a cooperating flexible joint part, and means for securing the joint parts in operative relationship including a pair of U-shaped members having interlocking portions and being adapted to be placed in engagement with the conduit from opposite sides thereof to bridge or close the open end of each U-shaped member.

3. A conduit member having connection means at each end thereof cast integral therewith, said connection means being of greater overall size or dimensions, generally transversely of the conduit member, than the conduit member itself, a connection device adapted to cooperate with the means at one end of the conduit member to provide a flexible joint, and a mechanism for securing the last mentioned means and said device together in operative position including a part having spaced portions adapted to embrace the conduit member adjacent said device and a gap providing for removal of the part transversely of the conduit member.

4. A conduit member having connection means at each end thereof cast integral therewith, said connection means being of greater overall size or dimensions, generally transversely of the conduit member, than the conduit member itself, a connection device mounted on each one of the coupled vehicles adapted to cooperate with the connection means at the ends of said conduit member, and a mechanism for securing one of the last mentioned means to its associated connection device including a part having spaced portions adapted to embrace the conduit member adjacent said device and a gap providing for removal of the part transversely of the conduit member.

5. A conduit member having connection means at each end thereof cast integral therewith, said connection means being of greater overall size or dimensions, generally transversely of the conduit member, than the conduit member itself, a connection device mounted on each one of the coupled vehicles adapted to cooperate with the connection means at the ends of said conduit member, to provide a pair of spaced flexible joints, and a mechanism for securing one of the last mentioned means to its associated connection device including a part having spaced portions adapted to embrace the conduit member adjacent said device and a gap providing for removal of the part transversely of the conduit member.

6. A conduit member having connection means at each end thereof cast integral therewith, said connection means being of greater overall size or dimensions, generally transversely of the conduit member, than the conduit member itself, a connection device mounted on each one of the coupled vehicles adapted to cooperate with the connection means at the ends of said conduit member, to provide a pair of spaced flexible joints, and a mechanism for securing one of the last mentioned means to its associated connection device including a part having spaced portions adapted to embrace the conduit member adjacent said device and a gap providing for removal of the part transversely of the conduit member, at least one of said devices being mounted for movement generally fore and aft of the vehicles.

7. A conduit member having connection means at each end thereof cast integral therewith, said connection means being of greater overall size or dimensions, generally transversely of the conduit member, than the conduit member itself, a connection device adapted to cooperate with the means at one end of the conduit member to provide a flexible joint, and a mechanism for securing the last mentioned means and said device together in operative position including a part having spaced portions adapted to embrace the conduit member adjacent said device and a gap providing for removal of the part transversely of the conduit member, said device being mounted for movement generally fore and aft of the vehicles.

In testimony whereof I have hereunto signed my name.

FREDERICK W. MARTIN.